(No Model.)
W. J. PERKINS.
SHINGLE SAWING MACHINE.
No. 369,811. Patented Sept. 13, 1887.
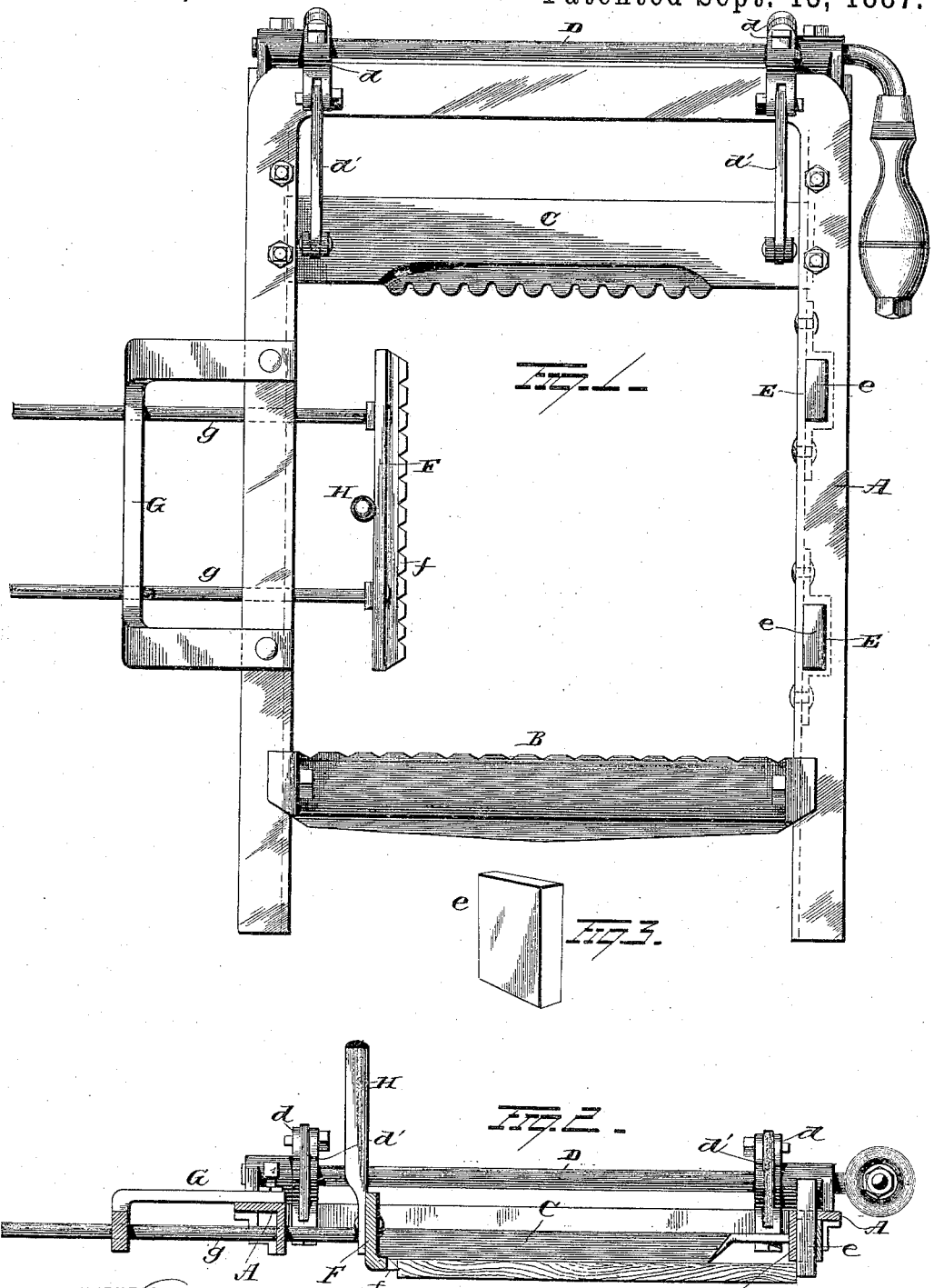

UNITED STATES PATENT OFFICE.

WILLIS J. PERKINS, OF GRAND RAPIDS, MICHIGAN.

SHINGLE-SAWING MACHINE.

SPECIFICATION forming part of Letters Patent No. 369,811, dated September 13, 1887.

Application filed June 8, 1886. Serial No. 204,486. (No model.)

*To all whom it may concern:*

Be it known that I, WILLIS J. PERKINS, of Grand Rapids, in the county of Kent and State of Michigan, have invented certain new and useful Improvements in Shingle-Machines; and I do hereby declare the following to be a full, clear, and exact description of the invention, such as will enable others skilled in the art to which it appertains to make and use the same.

My invention relates to an improvement in shingle-machines, and more particularly in the carriages which are adapted to support and feed the bolts to the saw. It often happens that the bolts are short of the distance to which the ordinary bolt-holding dogs are adapted to close, and the bolts are thereby loosely held, and when quite thin have a tendency to slide back under the frame of the carriage. Hitherto, when the bolt has been insecurely held by the ordinary dogs, the sawyer has been in the habit of steadying it with his hand, and serious accidents have resulted therefrom, aside from the annoyance and imperfect saw-cuts which have been liable to occur, and besides the personal risk in a power-feed machine the sawyer's duties are so arduous that he has no time to steady the bolt.

The object of my present invention is to provide an auxiliary dog or dogs adapted to operate either alone or in conjunction with the ordinary dogs to hold the bolt in its proper position on the carriage whatever its variance from the ordinary length, and to further hold the portion of the bolt which remains after it has been reduced so thin that the ordinary dogs will not engage it in a position to be further cut into valuable stock.

A further object is to provide a dog or dogs for the above purpose which may be adjusted to take up wear, and which will not be liable to damage the saw-teeth should the latter happen to engage them.

With these ends in view my invention consists in certain features of construction and combinations of parts, as will be hereinafter described, and pointed out in the claims.

In the accompanying drawings, Figure 1 is a view of a shingle-machine carriage embodying my invention. Fig. 2 is a vertical section taken transversely through the center of the carriage and showing a thin remaining portion of a bolt held by the side dogs, and Fig. 3 shows one form of adjustable block.

A represents the carriage-frame; B, the stationary dog at or near one end of the frame; C, the movable dog at or near the opposite end of the frame; D, the rock-shaft for operating the movable dog; $d$, the arms attached to the rock-shaft, and $d'$ the links connecting the ends of the arms $d$ with the movable dog.

The general shape and construction of the carriage-frame, stationary and movable dog, and means for operating the movable dog are the same or similar to the corresponding parts shown and described in Letters Patent No. 342,534, granted to me on the 25th of May, 1886, and in several of my preceding patents, and need not be more particularly described herein.

In one side of the carriage-frame, preferably the side farthest from the saw, are formed one or more vertical sockets, E, preferably two, adapted to receive blocks $e$, of wood or other suitable material. The sockets E are preferably oblong in cross-section, and the blocks $e$ are conveniently formed of tough wood inserted endwise in the sockets with a tight fit, and adapted to be driven through and caused to project below the carriage the distance required. It is intended that their lower ends shall rest in close proximity to the upper side of the saw-plate as the carriage travels over it. To the opposite side of the carriage-frame from the adjustable blocks $e$ is secured a sliding dog, F.

A convenient construction and arrangement of the dog F is as follows: A bracket, G, is attached to the frame and forms a second support and guide for a pair of rods, $g$, to the ends of which the dog F is secured. The rods $g$ are adapted to slide in perforations formed in or bearings secured to the side of the frame A and the bracket G, and thereby admit of the dog F being slid toward and away from the blocks $e$. The dog F preferably consists of an upright iron plate having its lower edge turned at right angles thereto, or nearly so, and holding-teeth $f$ formed thereon. A handle, H, is secured to the dog for sliding it toward and away from the bolt. Instead of the iron plate provided with a set of holding-teeth, a frame or bar provided with one or more sockets having adjustable wooden blocks secured therein in a manner similar to that above described with reference to the socket E and blocks e might be employed; or the adjustable blocks might be employed in connection with the toothed plate, sockets for that purpose being formed in the plate.

The above construction admits of holding the bolt securely by drawing the dog F into contact with its side when the bolt is too short to have the dogs take a firm hold on its ends, and the adjustable block or blocks e effectually prevent the thin unsawed portion of a bolt from creeping beneath the front of the frame. The said block or blocks e furthermore, either alone or in conjunction with the dog F, serve to engage and hold steadily in place, while being sawed, the last thin portion of a bolt which has dropped below the grip of the end dogs, and which has yet some good shingle-stock in it. The close proximity of the lower ends of the blocks e to the side of the saw-plate and their liability to be cut more or less by the saw-teeth render it advisable to construct the blocks of some material which will not be liable to break or seriously dull the teeth. Wood is employed for this purpose on account of its cheapness and the readiness with which it may be fitted to the sockets; but the faces of the wooden blocks might be covered with lead or other soft metal to prevent rapid wear, or the block might be formed entirely of such soft metal. As fast as the blocks e become worn by the action of the saw or from other cause, they may be forced down, keeping their lower ends continually in the approved position relatively to the saw-plate. By thus sawing the entire bolt into shingles a very appreciable saving is made, amounting to several hundred shingles in a day's work, and by the employment of the sliding auxiliary dog time is saved, a better class of work produced, and danger of injury avoided.

In the event that the dogs fail to grip the bolt properly the bolt slides back into contact with the wooden blocks and is pushed by said blocks forwardly onto the saw.

It is evident that slight changes might be resorted to in the form and arrangement of the several parts described without departing from the spirit and scope of my invention; hence I do not wish to limit myself strictly to the construction herein set forth; but, Having fully described my invention, what I claim as new, and desire to secure by Letters Patent, is—

1. In a shingle-machine, the combination, with a carriage having a stationary and a movable dog adapted to engage the ends of the bolt, of an adjustable bolt-holding block located at the side of the carriage and adapted to be adjusted toward and away from the adjacent surface of the saw, substantially as set forth.

2. In a shingle-machine, the combination, with a carriage adapted to support a shingle-bolt, and gripping-dogs attached thereto, of adjustable bolt holding or pushing blocks secured in sockets at the side of the carriage and adapted to be adjusted toward and away from the saw, substantially as set forth.

3. In a shingle-machine, the combination, with a shingle-bolt carriage provided with bolt-holding dogs, of a vertically-adjustable block secured to the side of the carriage at a point between the dogs and adapted to force the bolt into engagement with the saw, substantially as set forth.

4. In a shingle-machine, the combination, with a shingle-bolt carriage provided with bolt-holding dogs, of vertically-movable blocks secured to the side of the carriage at a point between the dogs and adapted to force the bolt into engagement with the saw, substantially as set forth.

5. In a shingle-machine, the combination, with a bolt-supporting carriage and dogs adapted to grip the ends of a bolt, of auxiliary dogs at the sides of the carriage adapted to grip the bolt when the latter is too thin to be gripped by the end dogs, substantially as set forth.

6. In a shingle-machine, the combination, with a bolt-supporting carriage and dogs adapted to grip the ends of the bolts, of a horizontally-adjustable dog secured at one side of the carriage-frame and adapted to engage one side of the shingle-bolt, and holding or pushing blocks secured to the opposite side of the carriage, adapted to engage the bolt, substantially as set forth.

In testimony whereof I have signed this specification in the presence of two subscribing witnesses.

WILLIS J. PERKINS.

Witnesses:
DANIEL M. WETZELL,
L. P. EDDY.